Patented June 3, 1924.

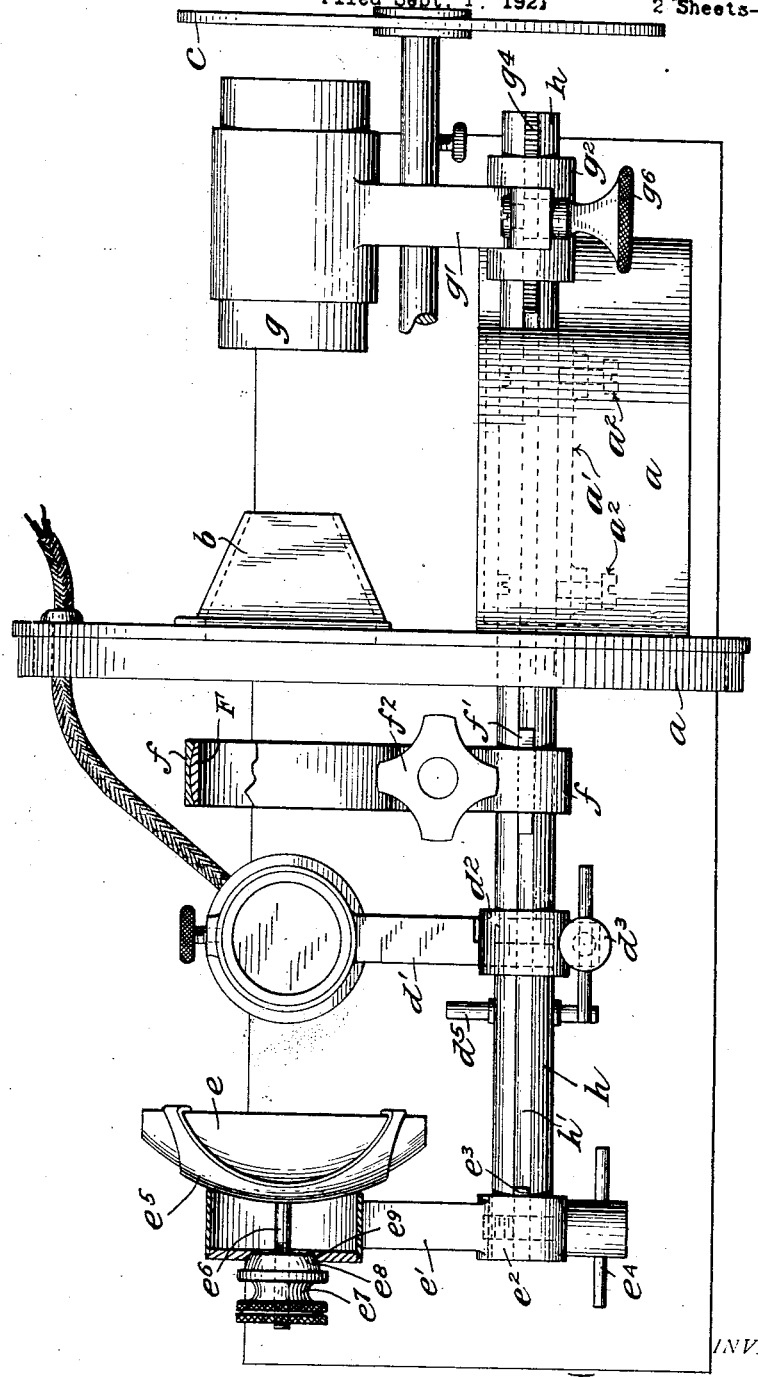

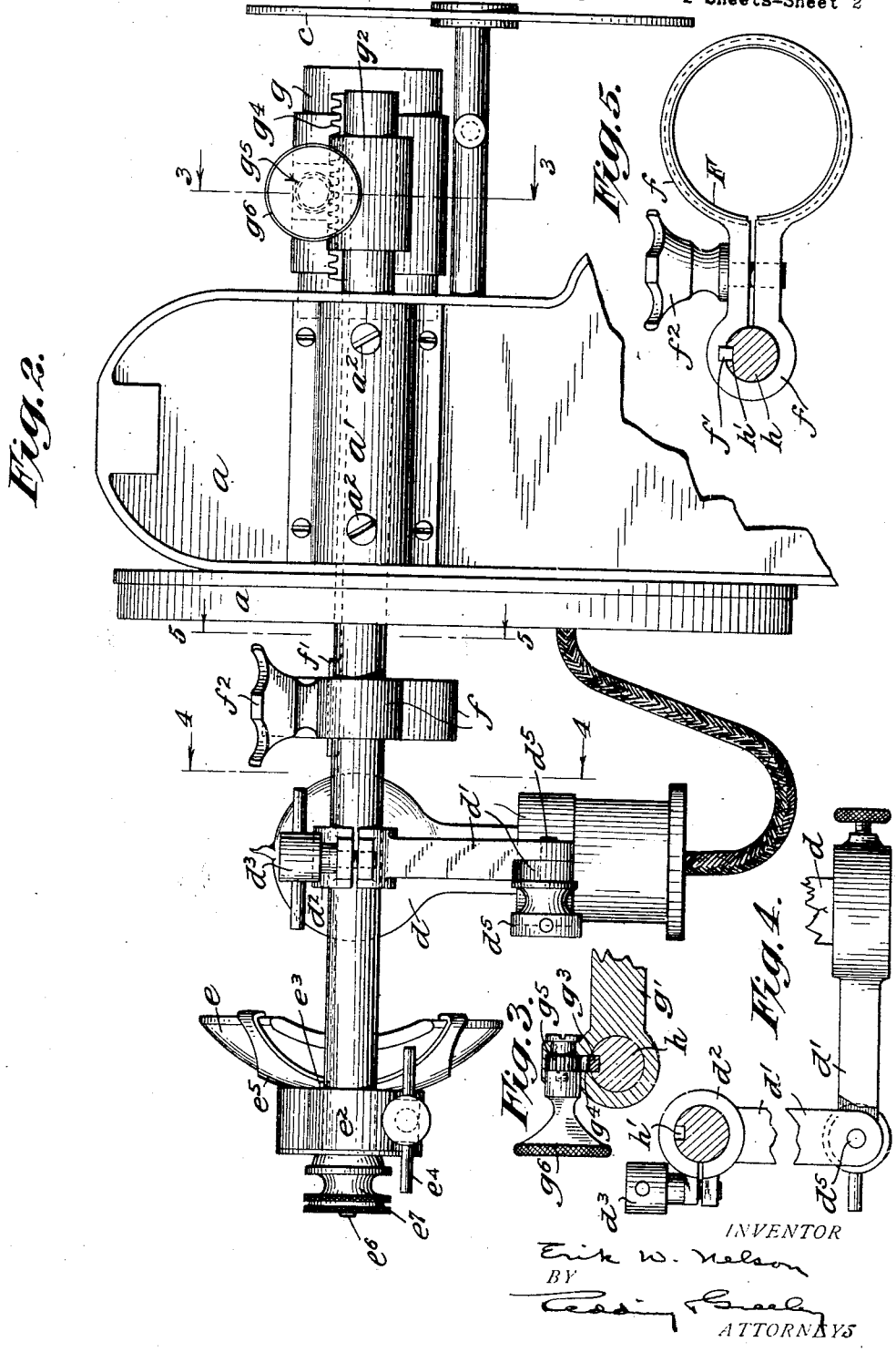

1,496,427

UNITED STATES PATENT OFFICE.

ERIK WM. NELSON, OF NEW ROCHELLE, NEW YORK.

MOTION-PICTURE PROJECTOR.

Application filed September 1, 1921. Serial No. 497,537.

*To all whom it may concern:*

Be it known that I, ERIK W. NELSON, a citizen of the United States, residing in the city of New Rochelle, in the State of New York, have invented certain new and useful Improvements in Motion-Picture Projectors, of which the following is a specification, reference being had to the accompanying drawings, forming a part hereof.

Motion picture projectors embody as elements devices which constitute the so-called optical system. These devices may include, for instance, a lamp, a reflector, a condenser, and a lens. These elements must be so co-ordinated in their optical functions as to project, in any given projector, the clearest possible image on the screen. To insure this result certain adjustments, some of which may be of a relatively permanent character and some of which may be termed "fugitive", need to be provided. Of these adjustments, probably none can be considered more important than that of axial alinement. This alinement, further, should be preserved having once been determined and it is the principal object of the present invention to provide, in a motion picture projector, a support for the elements of the optical system which shall automatically insure the desired alinement when the devices are mounted thereon and shall itself be so constructed as to have capacity for angular movement in order to throw the alined devices into predetermined relation to the window or other fixed part of the machine. A further object of the invention is to provide a support of the character described which shall be of simple construction, easy to assemble and adjust and readily accessible for mounting or dismounting of the projecting devices and for their longitudinal adjustment thereon.

The drawings illustrate, by way of example, an exceedingly simple construction of the improved support for the projecting elements, a somewhat conventional showing of the number and relation of the latter being made in the interest of clearness, although it is to be understood that the invention itself is not limited to the character of the devices comprising the optical system, since the problem here involved is not that of projecting, as such, but rather of supporting the projecting elements adjustably in their most effective relationship.

Reference is now to be had to the accompanying drawings for a detailed description of the illustrated embodiment, wherein—

Figure 1 is a view in elevation showing so much of a motion picture projector as is necessary for an understanding of the application thereto of the improved support, with suitable projecting elements mounted adjustably thereon.

Figure 2 is a view of the same as seen from below.

Figures 3, 4 and 5 are sectional detail views taken along the planes indicated by the lines 3—3, 4—4 and 5—5, respectively, of Figure 2, and looking in the direction of the arrows.

A projector of conventional form will include a frame $a$ having supported therein at some suitable position a window funnel $b$ through which light passes to project the image on the screen under the control of the shutter $c$, as will be understood. The elements of the so-called optical system may include a lamp $d$, a reflector $e$ for the rays thereof in the rear of the lamp, and a light condenser whose supporting bracket is indicated generally at $f$ and which is placed between the lamp $d$ and the window funnel $b$, the reflector, lamp and condenser all being disposed at the rear of said funnel. Usually, there will be mounted adjustably in front of the funnel $b$ a lens $g$ at the rear of the shutter $c$. Whether the precise projecting elements referred to are employed or not or whether their indicated relationship is maintained in any particular machine is a matter with which the present invention is not concerned. Having these or other elements performing the same general functions, it is necessary in projecting machines to adjust them to predetermined relationship if their optical co-ordination is to be brought to a high point of efficiency. In the first place, it should be apparent that a certain alinement of the projecting elements is essential and that then the longitudinal disposition of the elements with respect to one another will determine in a large measure the clarity of the image. Since these parts are related in the manner indicated generally herein, it is proposed in the improved machine to provide a common support for them all or most of them, which support itself may be given an initial adjustment in the frame to bring the elements in the desired angular relation to, say, the window funnel $b$. In the illustrated embodiment this support comprises a rod $h$ which extends longitudinally of the machine and is supported in a sleeve $a'$ secured to any suitable part of the frame $a$. Set screws $a^2$ may pass through the frame $a$ and engage the rod $h$ for the purpose of securing it in any desired angular or longitudinal position. The invention is not to be limited to the details of construction of the means for supporting the rod adjustably on the frame, since it will be apparent to one skilled in the art that some other simple and effective provision may be made to the same end.

The rod $h$ may be grooved longitudinally to provide a key-way for a purpose which will hereafter appear. The units of the optical system which are to be supported on the rod may be, generally speaking, carried in bracket arms $e'$, $d'$, $g'$, for the reflector, lamp and lens, respectively, and these arms may terminate in split collars $e^2$, $d^2$, $g^2$, which may be slipped on to the rod $h$ when the elements are mounted. It has been found that the brackets $e'$, $f$ and $g'$ may be advantageously mounted and fixed in permanent angular relation on the rod $h$ when the machine is assembled in order that the centers of the respective units supported thereon may be alined. This may be insured most conveniently by providing keys $e^3$, $f'$ and $g^3$ for the collars $e^2$, $f$ and $g^2$, respectively, which keys rest in a key-way $h'$ and hold their respective collars in fixed angular relation thereto, as will be evident. One of the keys $g^3$, as shown in Figure 3, may have cut therein rack teeth $g^4$ with which may engage a pinion $g^5$ carried on a rotatable thumb wheel $g^6$ which is journaled in the bracket $g'$. Rotation of the pinion $g^5$ will cause longitudinal movement of the bracket $g'$ with the lens $g$, thereby affording a very convenient and close adjustment for the projecting lens. The bracket $f$ may be slid longitudinally along the rod $h$ and clamped in adjusted position thereon by means of a lock screw, indicated generally at $f^2$, and passing through the split bracket $f$. In somewhat similar manner the split collar $e^2$ may be clamped on to the rod $h$ by means of the thumb screw $e^4$ when the bracket $e'$ has been adjusted to the desired longitudinal position on the rod. The bracket $d'$ for the lamp $d$ need not be keyed on the rod $h$ since the angular position of each lamp needs to be adjusted in order to produce the clearest image. However, the longitudinal position of the bracket $d'$ has to be determined by adjustment and a clamp to effectuate this adjustment is afforded by the thumb screw $d^3$ which passes through the split collar $d^2$. The bracket $d'$ is jointed, as at $d^4$, for further angular adjustment, a set screw $d^5$ being provided for frictional clamping in a manner often employed.

The bracket arm $e'$ terminates in a cup-like portion in which seats a support $e^5$ for the reflector $e$. This support $e^5$ is spherical in order that it may be rocked in the cup and the reflector $e$ thereby adjusted. A screw $e^6$ extends rearwardly from this support and has threaded on its outer end a thumb nut $e^7$ which may also have a spherical body $e^8$ adapted to seat in an opening $e^9$ in the rear wall of the cup.

The peculiar form of the split bracket $f$ is illustrated best in Figure 5, although it appears from Figure 1 that this bracket carries within its annular portion a split ring F which has a spherical periphery to seat in a spherical groove formed on the inner periphery of the annular part of the split bracket $f$.

The condenser has not been illustrated in detail, but it will be evident from Figure 5 that when the set screw $f^2$ is backed off the ring F will be loosened for oscillation on its spherical seat. With the condenser in proper adjusted relation to the window funnel $b$ the screw $f^2$ may be set up on to clamp the ring F in place.

In assembling the parts the split bracket $f$ is slipped on to the rod $h$ with its key $f'$ and the collars $d^2$ and $e^2$ are successively slid on to one end of the rod $h$ until in approximately their proper longitudinal relation to one another. The collar $g^2$ for the lens $g$ may then be slipped on to the other end. The keys $e^3$, $f'$ and $g^3$, of course, serve to hold the respective brackets $e'$, $f$ and $g'$ in proper predetermined angular position, establishing the general alinement necessary for proper optical co-ordination. Accordingly, an adjustment of the angular position of the rod $h$ in its supporting bracket $a'$ by means of the set screws $a^2$ will correspondingly bring the said three brackets with their units into proper relation with respect to the window funnel $b$. Each lamp $d$, however, needs to be swung laterally in order to produce the most efficient projection of the image. To this end the collar $d^2$ is not keyed to the rod $h$ but may be revolved thereon and clamped through the set screw $d^3$ in any proper position. The set screw $d^5$ may be used further in swinging one arm of the bracket. The reflector $e$ may be adjusted through its frame $e^5$ and binding screw $e^6$ until its focal center is properly adjusted for the lamp $d$. The condenser is mounted within the spherical ring F and this ring is clamped through the set screw $f^2$ when the condenser is in proper position as determined by the projected image. The lens $g$ is moved longitudinally by manipulation of the thumb screw $g^6$ and pinion $g^5$, for a purpose which will be understood.

The entire construction is characterized by extreme simplicity, accessibility of parts and ease of adjustment. The angular adjustment of the units secured through the rod $h$ may be termed, in a sense, permanent, since the alinement is preserved during this adjustment, while the longitudinal adjustment of the individual units along the rod may be termed, in a sense, "fugitive". This relation of parts enables the operator, through simple manipulation, to project the clearest possible image and preserve it by longitudinal adjustment of any one or more of the units along the rod. Changes in details of construction of the units and of the rod itself and its supporting clamp may be made without departing from the spirit of the invention, provided the general organization of parts is retained and the adjustments are provided for in accordance with the principle described herein.

I claim as my invention:

1. In a motion picture projector, in combination with the frame thereof, supporting brackets for the projecting units of the optical system, a rod journaled in the frame, means to secure the rod in angularly adjusted position, said rod being provided with a key-way, keys to hold the supporting brackets in predetermined angular relation to the rod while permitting longitudinal movement thereof, and means to secure the brackets in adjusted position.

2. In a motion picture projector, in combination with the frame, a window funnel provided thereon, supporting brackets for the projecting units of the optical system including a bracket for the lens in front of the window funnel and brackets for the condenser, the lamp and the reflector supported at the rear of the window funnel, and a rod journaled in the frame and adjustable angularly therein and supporting said brackets with capacity for longitudinal movement.

3. A support for the condenser in a motion picture machine, comprising a split ring formed with a spherical seat on its inner periphery, a supporting ring for the condenser having its outer periphery of spherical form to rest in said spherical seat adjustably and means to clamp the split ring to hold the second named ring in adjusted position.

4. In a motion picture projector, a support for a reflector including a frame having a spherical back, an open cuplike portion in which the frame is seated with capacity for rocking, a stud carried with the back and passing through the rear wall of said open cuplike portion and a thumb nut co-operating with said stud to clamp the frame in adjusted position.

This specification signed this 30th day of August, A. D. 1921.

ERIK WM. NELSON.